United States Patent Office 3,090,807
Patented May 21, 1963

3,090,807
ISOMERIZATION OF SATURATED ALIPHATIC CARBOXYLIC ACIDS
Gerhard Illing, Neuleiningen, and Nikolaus von Kutepow, Karlsruhe-Ruppurr, Germany, assignors to Badische Anilin- & Soda-Fabrik Aktiengesellschaft, Ludwigshafen (Rhine), Germany
No Drawing. Filed July 27, 1959, Ser. No. 829,521
Claims priority, application Germany July 31, 1958
11 Claims. (Cl. 260—537)

This invention relates to a process for the isomerization of aliphatic carboxylic acids.

We have found that saturated aliphatic carboxylic acids can be isomerized by heating them with carbon monoxide at temperatures between 150° and 300° C., preferably between 230° and 270° C., preferably under a pressure between 20 and 700 atmospheres, in the presence of (a) a metal carbonyl and (b) chlorine, bromine, or iodine and/or one or more compounds of one or more of these halogens as catalysts, and preferably in the presence of (c) an activator and (d) of water.

In this way an isomerization of the carbon skeleton of the acids is achieved. Thus linear acids can be converted into branched acids, as for example normal valeric acid partly into 2-methylbutyric acid, and conversely branched acids can be converted into linear acids, as for example 2-methylbutyric acid partly into normal valeric acid. From adipic acid there is formed in part 2-methylglutaric acid and, in a smaller amount, 2,3-dimethylsuccinic acid.

Saturated aliphatic linear and branched mono- and di-carboxylic acids with at least 4 carbon atoms are suitable for the reaction. Among the monocarboxylic acids those with up to 18 carbon atoms and especially those with 4 to 6 carbon atoms are preferred. Of the dicarboxylic acids it is advantageous to use those with up to 12 carbon atoms and especially those with 6 to 10 carbon atoms. Examples of suitable carboxylic acids are: butyric acid, valeric acid, caproic acid, oenanthic acid, 2-methylbutyric acid, 2-ethylhexane carboxylic acid, palmitic acid, stearic acid, adipic acid, 2,2,5,5-tetramethyladipic acid, suberic acid and sebacic acid.

Suitable metal carbonyls, which are preferably used in amounts of 0.5 to 20% with reference to the carboxylic acid, are those of the metals of the 6th, 7th or 8th group of the periodic system, for example the carbonyls of palladium, vanadium, chromium, and preferably those of the elements of the iron group of the periodic system and especially cobalt carbonyl and nickel carbonyl. The carbonyls may be used as such, but it is preferable to produce them in the reaction mixture. For this purpose the carbonyl-forming metal or a suitable compound thereof, for example a hydroxide, oxide, carbonate, acetate, chloride, bromide or iodide, is added to the carboxylic acid in the reaction vessel and such an amount of carbon monoxide pressed in that the pressure at the reaction temperature is 20 to 700 atmospheres and advantageously 200 to 300 atmospheres. It is recommendable to use the carbonyl-forming metal in a state of fine division. The so-called carbonyl metals which are obtained by thermal decomposition of the corresponding metal carbonyls are especially suitable. It is recommended that the isomerization should also be carried out under a carbon monoxide pressure when the metal carbonyls are used as such. In this way decomposition of the metal carbonyls is suppressed. A part of the carbon monoxide may be replaced by inert gases, such as nitrogen and carbon dioxide, but a lower carbon monoxide partial pressure again leads to increased decomposition of metal carbonyl.

The halogen fluorine is unsuitable for the reaction. Chlorine may be used but has little to recommend it. Bromine yields better results and iodine the best results. Compounds of the halogens with each other, such as iodine chloride and iodine bromide, are also good catalysts. Other suitable halogen compounds are alkyl and aryl halides, such as ethyl iodide and iodobenzene, and also halogen hydracids and their salts, as for example potassium iodide, ammonium iodide, trimethylammonium iodide or dimethylammonium iodide. The same order of precedence applies for the employability of these as for the halogens themselves. It is preferable to use 0.5 to 4% of halogen or halogen compound with reference to the acid to be isomerized.

The activators increase the yield of isomerized acids and the speed of the isomerization. There may be used compounds of bismuth, antimony, titanium, boron, iron or tin, preferably the oxides or halides with the exception of the fluorides. Suitable activators are for example bismuth oxide, antimony oxide, bismuth iodide, antimony bromide, hexachlorostannic(IV) acid, trichloro-tri-iodo-antimonic(III) acid, hexachloro-titanic(IV) acid, trichloro-tri-iodo-ferric(III) acid and the partial hydrolysis products of the said halogen acids. The halogen acids are produced in a simple way by reaction of the corresponding metal halides with the equivalent amount of hydrogen halide. The activator is preferably used in an amount of 0.1 to 1% with reference to the acid to be isomerized. It may be added with or without a carrier. Examples of suitable carriers are activated carbon, pumice and silica gel. When using a carrier it is possible to carry out the isomerization at lower pressures. The same effect is also achieved by adding the activator and the carrier separately or by precipitating a carbonyl-forming compound on the carrier.

In the preferred embodiment of the process, nickel carbonyl is used as catalyst which is produced from nickel metal in the reaction mixture. It is advantageous to use 3.5 to 5% by weight of nickel powder, 1.5 to 3% by weight of iodine, 0.5 to 1% by weight of bismuth iodide, 0.1 to 1% by weight of hydrogen iodide and up to 10% by weight of water. These percentages relate to the carboxylic acid to be isomerized.

The isomerization may be carried out for example by charging the carboxylic acid, the carbonyl-forming metal, the halogen or halogen compound, the activator and preferably a few percent by weight of water into a pressure vessel stable to corrosion. The water suppresses the formation of anhydride which occurs under the reaction conditions. Then carbon monoxide is pressed in and the mixture heated to a temperature between 150° and 300° C., preferably between 230° and 270° C. Higher temperatures are not recommended because the acids then more readily decarboxylate. The reaction period depends on the temperature and on the desired degree of isomerization and varies between a few minutes and about 50 hours.

The decarboxylation products can be separated from the reaction mixture by reason of their higher volatility. The monocarboxylic acids arising by the isomerization of dicarboxylic acids may also be recovered by extraction with gasoline hydrocarbons in which the dicarboxylic acids have little solubility. Linear dicarboxylic acids may be separated from branched dicarboxylic acids with the same number of carbon atoms by crystallization from water or benzene. Thus for example suberic acid is considerably less soluble than the isomeric 2-methyl-pimelic acid. An excellent method for determining the composition of the isomerization mixture is gas chromatography (see for example Keulemans, "Gas Chromatography," Reinhold Publ., New York, 1957).

Aliphatic dicarboxylic acids, especially with even carbon numbers, such as adipic acid, suberic acid and sebacic acid, are known as initial materials for polyesters or polyamides. Their properties may be modified by addition of softeners. The same action is however also achieved by building into the high molecular substances branched dicarboxylic acids with odd numbers of carbon atoms between the carboxylic groups. These acids then undertake the function of an internal softener. According to this invention, dicarboxylic acid mixtures may be advantageously used for the production of polyamides and polyesters with definite properties. Separation of the isomeric acids is not necessary in this case. The reaction is directed so that the initial material is isomerized only to a certain extent and the isomer mixture is used directly for the production of the high molecular weight substances. Working in this way constitutes one of the most important uses of the process according to this invention.

The following examples will further illustrate this invention but the invention is not restricted to these examples. The parts specified in the examples are parts by weight.

*Example 1*

A mixture of 1000 parts of adipic acid, 50 parts of a nickel powder which has been obtained by thermal decomposition of nickel carbonyl, 20 parts of iodine, 10 parts of bismuth iodide and 50 parts of water are placed in a pressure vessel of corrosion-resistant material which is provided with a mixing means. 50 atmospheres of carbon monoxide are forced in and heated. When the temperature has reached 250° C., the carbon monoxide pressure is increased to 200 atmospheres and the mixture kept for 20 hours at the said temperature.

After cooling, the nickel tetracarbonyl is removed in a current of nitrogen and the monocarboxylic acids are recovered by distillation of the residue under reduced pressure or by extraction with petroleum ether. They consist to the extent of 36.7% of 2-methylbutyric acid of the boiling point 177° C. and to the extent of 63.3% of normal valeric acid of the boiling point 185° C. The yield of monocarboxylic acids amounts to 11.2%.

The dicarboxylic acids are separated by heating with benzene, the 2-methylglutraic acid thereby passing into solution whereas the adipic acid dissolves only slightly when hot, and upon cooling, in contrast to 2-methylglutaric acid, is immediately precipitated again. In this way there are obtained 30.6% of 2-methylglutraic acid of the melting point 78° to 79° C. and 52.5% of adipic acid. 1 to 2% of 2,3-dimethylsuccinic acid are detectable analytically.

Instead of nickel metal it is also possible to use nickel iodide or nickel carbonyl.

The results given in the following table are obtained by varying the reaction period, reaction temperature and carbon monoxide pressure:

*Table*

| Time (hours) | Temp., ° C. | Pressure atm., CO | Percent adipic acid | Percent alpha-methyl glutaric acids | Percent monocarboxylic acid |
|---|---|---|---|---|---|
| 5 | 250 | 200 | 74 | 22.7 | 3 |
| 50 | 250 | 200–268 | 12.9 | 18.7 | 79 |
| 10 | 236 | 200 | 89.4 | 4.2 | 1.3 |
| 10 | 240 | 200 | 88.5 | 4.3 | 1.5 |
| 10 | 245 | 200 | 77.5 | 8.1 | 3.8 |
| 10 | 250 | 200 | 61.0 | 18.0 | 4.5 |
| 10 | 260 | 200 | 59.2 | 25.2 | 11.6 |
| 15 | 260 | 200 | 36.8 | 29.8 | 27.9 |
| 35 | 250 | 150 | 42.0 | 24.3 | 24.5 |
| 10 | 250 | 150 | 58.5 | 23.3 | 11.5 |
| 20 | 260 | 180 | 32.1 | 10.8 | 53.3 |
| 35 | 250 | 100 | 29.6 | 19.2 | 49.5 |
| 35 | 250 | 50 | 54.1 | 4.1 | 24.6 |

Instead of 10 parts of bismuth oxide there may also be used 10 parts of hexachlorostannic(IV) acid, hexachlorotitanic(IV) acid, trichloro-tri-iodo-antimonic(III) acid or trichloro-tri-iodo-ferric(III) acid. Instead of 20 parts of iodine there may be used 20 parts of iodine tribromide, 30 parts of ammonium iodide, 30 parts of trimethylammonium iodide or 30 parts of dimethyl ammonium iodide. Under otherwise the same reaction conditions the reaction mixtures given in the table are obtained within the limits of analytical error.

Instead of 50 parts of nickel powder as used in Example 1, there may also be used 50 parts of iron powder, 50 parts of cobalt acetate, 60 parts of nickel vanadate or 500 parts of silica strings with 5% by weight of palladium. In this way there are obtained similar products as when using nickel powder but the isomerization is less extensive.

*Example 2*

1000 parts of suberic acid are heated with 150 parts of nickel carbonyl, 40 parts of 70% hydroiodic acid and 10 parts of bismuth oxide in a pressure vessel under a pressure of 200 atmospheres of carbon monoxide to 250° C. One third of the suberic acid is thereby converted into alpha-methyl-pimelic acid of the melting point 57° to 58° C.

*Example 3*

1000 parts of sebacic acid, 50 parts of the nickel powder used in Example 1, 20 parts of iodine, 10 parts of bismuth iodide and 50 parts of water are heated in a pressure vessel with mixing means under a carbon monoxide pressure of 80 atmospheres. When the temperature has reached 250° C., the carbon monoxide pressure is increased to 200 atmospheres. The pressure rises slightly in the course of time by reason of decarboxylation.

After 35 hours, the whole is allowed to cool, the nickel carbonyl removed with nitrogen and the oily portion of the mixture filtered off by suction. The solid portion melts at 105° to 110° C. and contains mainly sebacic acid. It is purified by boiling with water.

The 2-methylazelaic acid is mainly present in the remaining filtrate which amounts to 470 to 490 parts. The iodine is removed by allowing a methanolic solution to run through a column of activated carbon. The pure 2-methylazelaic acid is obtained by distillation under reduced pressure. First the monocarboxylic acids distil over at normal pressure at 140° to 160° C. (14 to 16% of the theory) and the 2-methylazelaic acid passes over at 190° to 195° C. at 0.5 mm. Hg or at 205° to 208° C. at 1 mm. Hg. It solidifies gradually and, after crystallization from 2-normal hydrochloric acid, has a melting point of 67° C.; its diamide melts at 148° C. The infra-red spectrum shows the branching by a characteristic absorption band at 7.25 microns. The yield of 2-methylazelaic acid is 27 to 29%.

If the same amount of initial materials is heated for 5 hours at 240° C. under 200 atmospheres of carbon monoxide, there are obtained 92% of sebacic acid, 4.3% of 2-methylazelaic acid and 1.1% of monocarboxylic acids.

EXAMPLE 4

350 parts of normal valeric acid, 17 parts of the nickel powder used in Example 1, 7 parts of iodine, 4 parts of bismuth iodide and 15 parts of water are heated at 250° C. in a pressure vessel for 23 hours under a carbon monoxide pressure of 200 atmospheres. After separating the catalyst (the iodine being precipitated by copper(II) oxide or lead(II) oxide) 332 parts of a mixture are obtained which according to chromatographic analysis contains 21.72% of 2-methylbutyric acid and 74.75% of normal valeric acid.

EXAMPLE 5

200 parts of 2-methylbutyric acid (99.2%), 10 parts of the nickel powder used in Example 1, 5 parts of iodine and 3 parts of bismuth iodide are heated at 250° C. in a pressure vessel for 15 hours under a carbon monoxide pressure of 200 atmospheres. After removal of the catalysts there are obtained 189 parts of a mixture which according to gas chromatographic analysis contains 34.97% of normal valeric acid and 60.01% of 2-methylbutyric acid.

To separate the isomers they are esterified with methanol and the ester mixture distilled through an efficient column. The fraction passing over at 114° to 116° C. is the 2-methylbutyric acid ester, while the normal valeric acid ester boils at 128° to 129° C. Proof of identity is adduced by conversion into the anilides.

EXAMPLE 6

500 parts of adipic acid and 575 parts of granulated activated carbon which has been soaked with a solution of 60 parts of cobalt acetate and a solution of 15 parts of bismuth oxide in 26 parts of 70% hydroiodic acid and then dried, are placed in a pressure vessel, 70 atmospheres of carbon monoxide are forced in and the whole heated for 10 hours at 260° C.

9 parts of lead oxide are added to the cooled reaction mixture. The acid mixture is esterified with methanol after the addition of 4 parts of sulfuric acid. The methanol is added at the rate at which the water is drawn out from the methyl valerate. The solid constituents are separated from the crude ester mixture by filtration. The ester mixture contains 8.1% of 2-methylbutyric acid methyl ester, 22.6% of methyl normal valerate, 21.4% of 2-methylglutaric acid ester and 36.4% of dimethyl adipate. The monocarboxylic acid esters are separated by distillation.

We claim:

1. A process for the isomerization of a saturated aliphatic carboxylic acid selected from the group consisting of alkanoic acids of 4 to 18 carbon atoms and alkanedioic acids of 4 to 12 carbon atoms which comprises heating said carboxylic acid with carbon monoxide under a pressure between 20 and 700 atmospheres and at a temperature between 150° and 300° C. in the presence of: (a) a metal carbonyl in which the metal is selected from the group consisting of the metals of the 6th, 7th and 8th groups of the periodic system, (b) an activator selected from the group consisting of oxides, chlorides, bromides and iodides of bismuth, antimony, titanium, boron, tin and iron, and (c) a halogen selected from the group consisting of chlorine, bromine and iodine.

2. A process as claimed in claim 1 wherein nickel carbonyl is used as metal carbonyl.

3. A process as claimed in claim 1 in which cobalt carbonyl is used as metal carbonyl.

4. A process as claimed in claim 1 wherein said isomerization is carried out in the presence of water.

5. A process as claimed in claim 4 in which the halogen is employed in the reaction as a halide selected from the group consisting of halides of said halogens with each other, halogen hydracids, ethyl iodide, iodobenzene, potassium iodide, ammonium iodide, dimethylammonium iodide and trimethylammonium iodide.

6. A process for the isomerization of a saturated aliphatic carboxylic acid selected from the group consisting of alkanoic acids of 4 to 18 carbon atoms and alkanedioic acids of 4 to 12 carbon atoms which comprises heating said carboxylic acid with carbon monoxide at a pressure of between 20 and 700 atmospheres and at a temperature between 150° and 300° C. in the presence of:

(a) a metal carbonyl of a metal of the iron group of the periodic system,
(b) a halogen selected from the group consisting of chlorine, bromine and iodine,
(c) an activator selected from the group consisting of oxides, chlorides, bromides and iodides of bismuth, antimony, titanium, boron, tin and iron, and
(d) water.

7. A process as claimed in claim 6 in which the halogen is employed in the reaction as a halide selected from the group consisting of halides of said halogens with each other, halogen hydracids, ethyl iodide, iodobenzene, potassium iodide, ammonium iodide, dimethylammonium iodide and trimethylammonium iodide.

8. A process as claimed in claim 6 wherein the metal carbonyl is produced in the reaction mixture from a metal of the iron group of the periodic system.

9. A process for the isomerization of an alkanedioic acid containing 4 to 12 carbon atoms which comprises heating said acid with carbon monoxide under a pressure between 20 and 700 atmospheres to a temperature between 150° and 300° C. in the presence of:

(a) a carbonyl of a metal of the iron group of the periodic system,
(b) iodine,
(c) an activator selected from the group consisting of oxides, chlorides, bromides and iodides of bismuth, and
(d) water.

10. A process as claimed in claim 9 wherein nickel carbonyl is used as carbonyl of a metal of the iron group.

11. A process as claimed in claim 9 wherein cobalt carbonyl is used as carbonyl of a metal of the iron group.

No references cited.